United States Patent
Zierer et al.

(10) Patent No.: US 10,174,636 B2
(45) Date of Patent: Jan. 8, 2019

(54) COMPRESSOR ASSEMBLY FOR GAS TURBINE

(71) Applicant: ANSALDO ENERGIA SWITZERLAND AG, Baden (CH)

(72) Inventors: Thomas Zierer, Ennetbaden (CH); Sven Olmes, Windisch (CH); Isaac-Eliseo Gomez-Lor-Lopez, Wettingen (CH)

(73) Assignee: ANSALDO ENERGIA SWITZERLAND AG, Baden (CH)

( * ) Notice: Subject to any disclaimer, the term of this patent is extended or adjusted under 35 U.S.C. 154(b) by 212 days.

(21) Appl. No.: 14/807,104

(22) Filed: Jul. 23, 2015

(65) Prior Publication Data
US 2016/0024970 A1     Jan. 28, 2016

(30) Foreign Application Priority Data

Jul. 25, 2014   (EP) .................................... 14178571

(51) Int. Cl.
*F01D 25/26*     (2006.01)
*F01D 25/24*     (2006.01)
(Continued)

(52) U.S. Cl.
CPC ............. *F01D 25/26* (2013.01); *F01D 9/042* (2013.01); *F01D 25/246* (2013.01); *F02C 6/08* (2013.01);
(Continued)

(58) Field of Classification Search
CPC .... F02C 6/08; F02C 9/18; F01D 25/26; F01D 25/265; F01D 9/042; F05D 2230/54;
(Continued)

(56) References Cited

U.S. PATENT DOCUMENTS 5,174,714 A * 12/1992 Plemmons ............ F01D 25/145
                                                29/888.01
5,921,751 A *  7/1999 Freling .................... C23C 4/02
                                                     415/177
(Continued)

FOREIGN PATENT DOCUMENTS

CN     1392331 A     1/2003
CN     1948731 A     4/2007
(Continued)

OTHER PUBLICATIONS

Machine translation of FR 2,925,108. Retrieved from ESPACENT on Jul. 18, 2017.*
(Continued)

*Primary Examiner* — Carlos A Rivera
*Assistant Examiner* — Sang K Kim
(74) *Attorney, Agent, or Firm* — Buchanan Ingersoll & Rooney PC

(57) ABSTRACT

A compressor assembly, and more in general relates to a compressor for a gas turbine providing a solution that teaches to locate within a cavity formed by the outer casing of the compressor and the inner vane carrier a separator element, or membrane, such to divide the cavity into two sub-cavities. This advantageously results in a more flexible design with respect to the positioning of the flange blow-off extractor and to the cavity sizing, as the flange position is not necessarily the boundary for the flow anymore as it would be without the separator element.

11 Claims, 9 Drawing Sheets

(51) Int. Cl.
*F02C 6/08* (2006.01)
*F02C 9/18* (2006.01)
*F01D 9/04* (2006.01)
*F04D 29/52* (2006.01)

(52) U.S. Cl.
CPC .............. *F02C 9/18* (2013.01); *F04D 29/522* (2013.01); *F05D 2230/54* (2013.01); *F05D 2240/15* (2013.01); *F05D 2260/20* (2013.01); *F05D 2260/231* (2013.01); *F05D 2300/20* (2013.01); *Y02T 50/673* (2013.01); *Y02T 50/675* (2013.01)

(58) Field of Classification Search
CPC ............ F05D 2240/15; F05D 2260/20; F05D 2260/231; F05D 2300/20; Y02T 50/673; Y02T 50/675
See application file for complete search history.

(56) References Cited

U.S. PATENT DOCUMENTS

| | | | |
|---|---|---|---|
| 6,672,070 B2 | 1/2004 | Bland et al. | |
| 7,491,029 B2 | 2/2009 | Pezzetti, Jr. et al. | |
| 8,336,315 B2 * | 12/2012 | Bauer | F01D 11/14 60/782 |
| 2003/0010014 A1 | 1/2003 | Bland et al. | |
| 2005/0132707 A1 | 6/2005 | Gebhardt | |
| 2006/0133939 A1 | 6/2006 | Vieillefond et al. | |
| 2006/0193721 A1 | 8/2006 | Adam et al. | |
| 2007/0086887 A1 | 4/2007 | Pezzetti, Jr. et al. | |
| 2012/0128470 A1 * | 5/2012 | Goodman | F01D 17/105 415/145 |
| 2013/0047575 A1 * | 2/2013 | Sakai | F02C 6/08 60/39.12 |
| 2014/0271111 A1 * | 9/2014 | Ballard, Jr. | F01D 11/24 415/1 |

FOREIGN PATENT DOCUMENTS

| | | |
|---|---|---|
| EP | 2 078 837 A1 | 7/2009 |
| EP | 2 570 632 A1 | 3/2013 |
| FR | 2 925 108 A1 | 6/2009 |
| JP | 2002130484 A | 5/2002 |

OTHER PUBLICATIONS

Office Action and Search Report dated Jul. 27, 2018 by the State Intellectual Property Office of China in corresponding Chinese Patent Application No. 201510440642.2, and an English Translation of the Office Action. (13 pages).

* cited by examiner

COMPRESSOR ASSEMBLY FOR GAS TURBINE

CROSS-REFERENCE TO RELATED APPLICATIONS

This application claims priority to EP Application No. 14178571.7 filed Jul. 25, 2014, the contents of which are hereby incorporated in its entirety.

FIELD OF THE INVENTION

The present invention generally relates to a compressor assembly, and more in general relates to a compressor for a gas turbine.

BACKGROUND

As well known, in gas turbines cooling air is extracted from the compressor. During steady state operation it is extracted for the purpose of cooling the turbine blading. During transient manoeuvres such as start-up and shut-down, typically a higher amount of air is extracted and released to the atmosphere to support stable operation of the gas turbine and to avoid, for example, stall in the compressor. This transient air extraction is called blow-off.

Generally, the flow of air is extracted through a bleed duct, or a slot, from the compressor annulus and gathered into a cavity. The cavity has a flange from which the flow is extracted into an external piping system of the engine. Such configuration is repeated at different circumferential positions. The flow is ducted via the piping system to the turbine for cooling or released to the atmosphere in transient manoeuvres.

The cavity is either formed by a casted space in the compressor casing or by an open space between the compressor vane carriers (often referred to as C.V.C.) and the compressor outer casing.

More in the specific, start-up conditions are potentially dangerous for a compressor because it operates far from design conditions. As a consequence, there is a large mismatch of flow, leading to large incidence angles on the blades and vanes. This results in flow separation. Moreover, at part-speed, the volume flow through the compressor gets too high due to an insufficient compression. This leads to an off-design axial velocity, which is not matched by proper rotational velocity of the blades.

In order to improve this phenomenon, the volume flow is reduced by extracting a large amount of air from the specified extraction points during start-up. It will then be purged in the blow-off system. Moreover, a fairly reduced amount of air is extracted from the main channel during normal operation for cooling purposes [1].

Shortly, the presence of an optimal compressor bleed cavity is vital to ensure that the above-mentioned processes during start-up and normal operations take place smoothly. An important aspect is the size of the cavity, which would have to contain the required amount of extracted air. The size of the cavity should compromise the extracted air both for start-up and normal operations.

However, constraints exist in terms of not only the functionality of the bleed system, but also of the entire structure and geometry of the overall compressor machinery, to achieve an optimal bleed flow.

For instance, a small bleed slot would be desired since it reduces the axial length of the compressor; and therefore reduces cost. Similarly, a small bleed cavity would reduce cost and compromise space constraint as well.

On the other hand, from an aerodynamic point of view, an optimal bleed system would be one that has low flow losses. This takes into account a larger view of the entire bleed system, from the air extraction point up to the piping lines.

The knowledge of flow pattern is essential to minimize losses due to the swirling and to enhance the geometry of the cavity, especially rounding at corners. As an example, FIG. 1 shows the flow topology in the bleed cavity, taking a rectangular form. The flow exits from the bleed slot into the bleed cavity, which immediately forms a swirl at the bleed exit due to the sudden turning of the flow. This forms an S-swirl with an adjacent swirl coming from the cavity bottom sidewall. The consequence of this S-swirl is a flow in the upward direction in the cavity, which then breaks into two 90° flows moving away from each other.

As the flows reach to the corner edges, they form a swirl and move vertically downwards again approaching the bottom corner edges, forming swirls. Then the whole flow topology repeats.

The configuration of the bleed cavity has an influence on the flow topology in the blow-off connection. The occurrence of different flow topologies in the bleed cavity is due to the flow going into the cavity from the bleed slot. In addition, the swirl system depends on the circumferential position, blow-off mass flow and the configuration of the cavity. The height of the cavity plays an important role in approximating the magnitude of friction losses along it. This could be obtained from a CFD calculation, which then further calculations on individual particle from different flow length could proceed, giving a better approximation of the friction loss.

Solutions known in the art tend to compromise between design and aerodynamic aspects as explained above to achieve the best possible design of the bleed and blow-off systems.

A critical point of the existing art is that, depending on the cavity width and flange position for the blow-off connection, a system of vortices is usually formed which results in high flow losses.

SUMMARY OF THE INVENTION

The object of the present invention is to solve the aforementioned technical problems by providing a compressor assembly and a compressor for a gas turbine.

Preferred embodiments are defined in correspondent dependent claims.

According to preferred embodiments, which will be described in the following detailed description only for exemplary and non-limiting purposes, the present solution teaches to locate within the cavity a separator element, or membrane, such to divide the cavity, formed by the outer casing of the compressor and the inner vane carrier, into two sub-cavities. As it will be clear from the description of an exemplary and non-limiting embodiment of the present invention, this advantageously results in a more flexible design with respect to the positioning of the flange blow-off extractor and to the cavity sizing, as the flange position is not necessarily the boundary for the flow anymore as it would be without the separator element, or membrane. The part can be now optimized with respect to clearances and pressure losses of the extraction flow.

According to preferred embodiments, the presence of the separator element reduces the heat transfer in the cavity. In fact, by providing two sub-cavities, one sub-cavity experiences a high heat transfer whilst the other sub-cavity is not exposed to high flow velocities.

The separator element is then used to guide the flow in an advantageous way, for example, reducing the number of vortices. This way, the flow losses are reduced.

According to preferred embodiments, the cavity inner walls may also be locally insulated for example with insulation materials or with air filled cavities.

Additionally and/or alternatively, the separator element may be provided with venting holes to vent the sub-cavity behind, which is the one where the extraction of flow for cooling or start-ups purposes does not take place. Advantageously, venting holes equalize temperatures and pressure between adjacent sub-cavities of a neighbouring cavity due to potential leakages, and can also eliminate undesired pressure differences.

BRIEF DESCRIPTION OF DRAWINGS

The foregoing objects and many of the attendant advantages of this invention will become more readily appreciated as the same becomes better understood by reference to the following detailed description when taken in conjunction with the accompanying drawings, wherein.

DETAILED DESCRIPTION OF THE DRAWINGS

Figure 2:
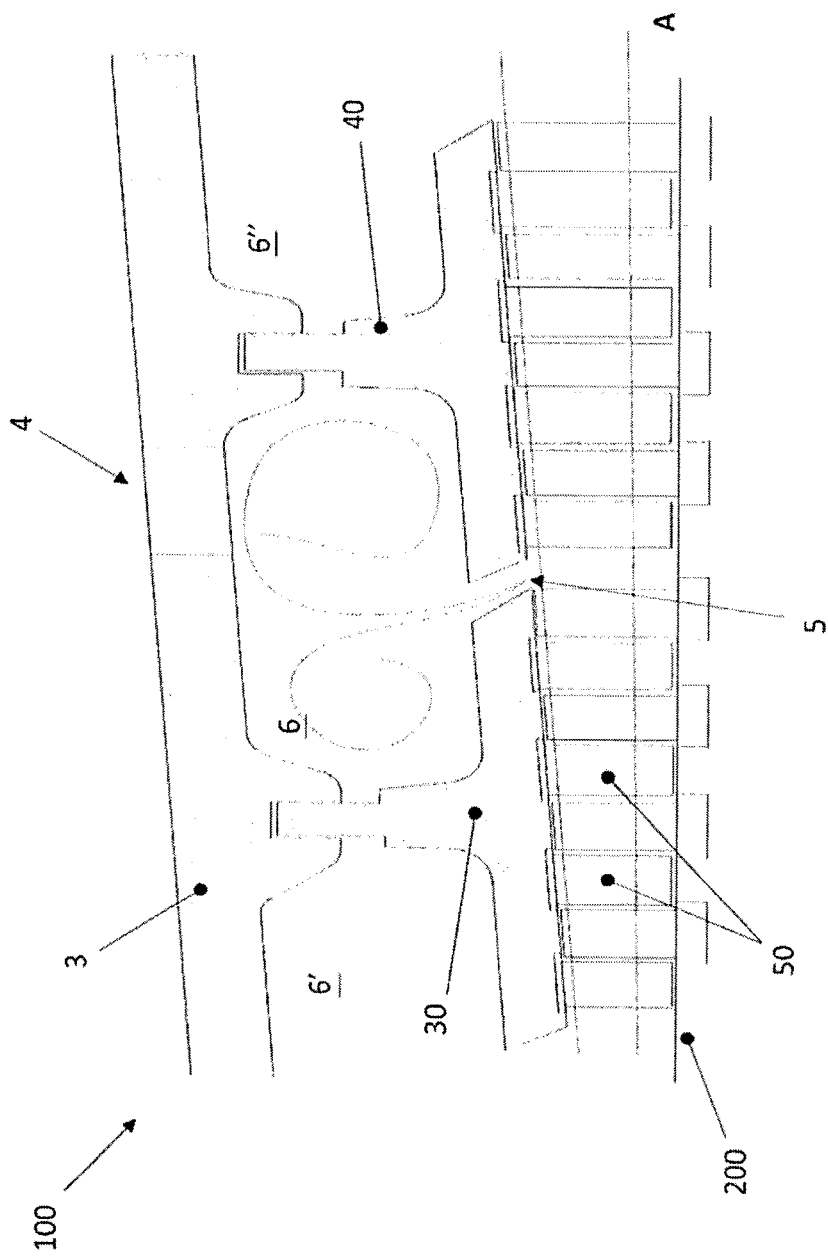
FIGS. 2-4 show a side cross-sectional view of three alternative compressor assemblies according to the prior art, where the slot for extracting the flow is located at three different positions along the axial development of the compressor.

With reference to FIG. 2, it is showed a compressor assembly 100 of a compressor in a side cross sectional view according to the known art. The compressor comprises a rotor 200 rotatable along an axis A.

The compressor assembly 100 comprises a compressor outer casing, generally indicated with numeral reference 3, which in turn comprises a blow-off opening 4 which provides the necessary connection means to an external piping system (not shown) to convey the flow of air drawn from the compressor to assist start-up phases and turbine blade cooling. Integral to the compressor outer casing 3 is a vane carrier, to which stator vanes 50 of the compressor are secured. In the figure, vanes carrier portions 30 and 40 define a bleed duct, or slot, 5. The compressor assembly 100 is arranged such that the outer casing 3, together with the vane carriers 3 and 4, define a cavity 6 for gathering a flow of fluid which is received from the compressor through the bleed duct 5. Alternatively, the cavity for accumulating a flow of fluid may be formed by a casted cavity located in the compressor outer casing.

The flow is then hosted within the cavity and fed externally through the blow-off connection 4 as detailed above. It will be appreciated that the configuration shown in FIG. 1 might be repeated a number of times along the axial development of the compressor annulus. More in particular, cavity 6 may have neighbouring cavities 6' and 6", the first one being partly defined by the common vane carrier 30, and the second one by the common vane carrier 40.

Figure 1:
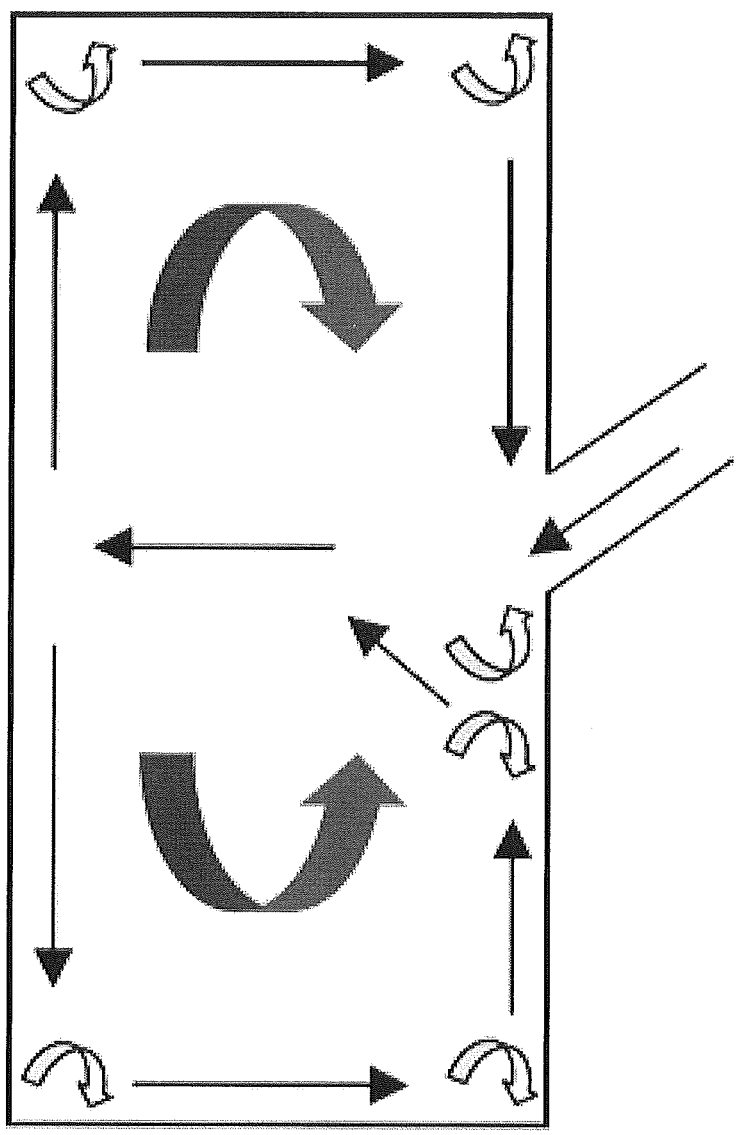
FIG. 1 shows an example of a flow topology in the bleed cavity, the bleed cavity being rectangular.

In the arrangement of FIG. 1, since the bleed duct 5 is positioned around a central portion of the cavity 6, the temperature in the cavity is approximately similar as in the compressor annulus. In fact, as well known, temperature of the compressed air in the compressor annulus increases axially in the direction of the flow, indicated by the arrow A of the figure. Having substantially same temperature in the cavity and in the annulus is beneficial for low clearances and stresses. However, as explained above with reference to FIG. 1, the vortexes and swirl experienced by the flow in the cavity lead to high aerodynamic losses.

Figure 3:
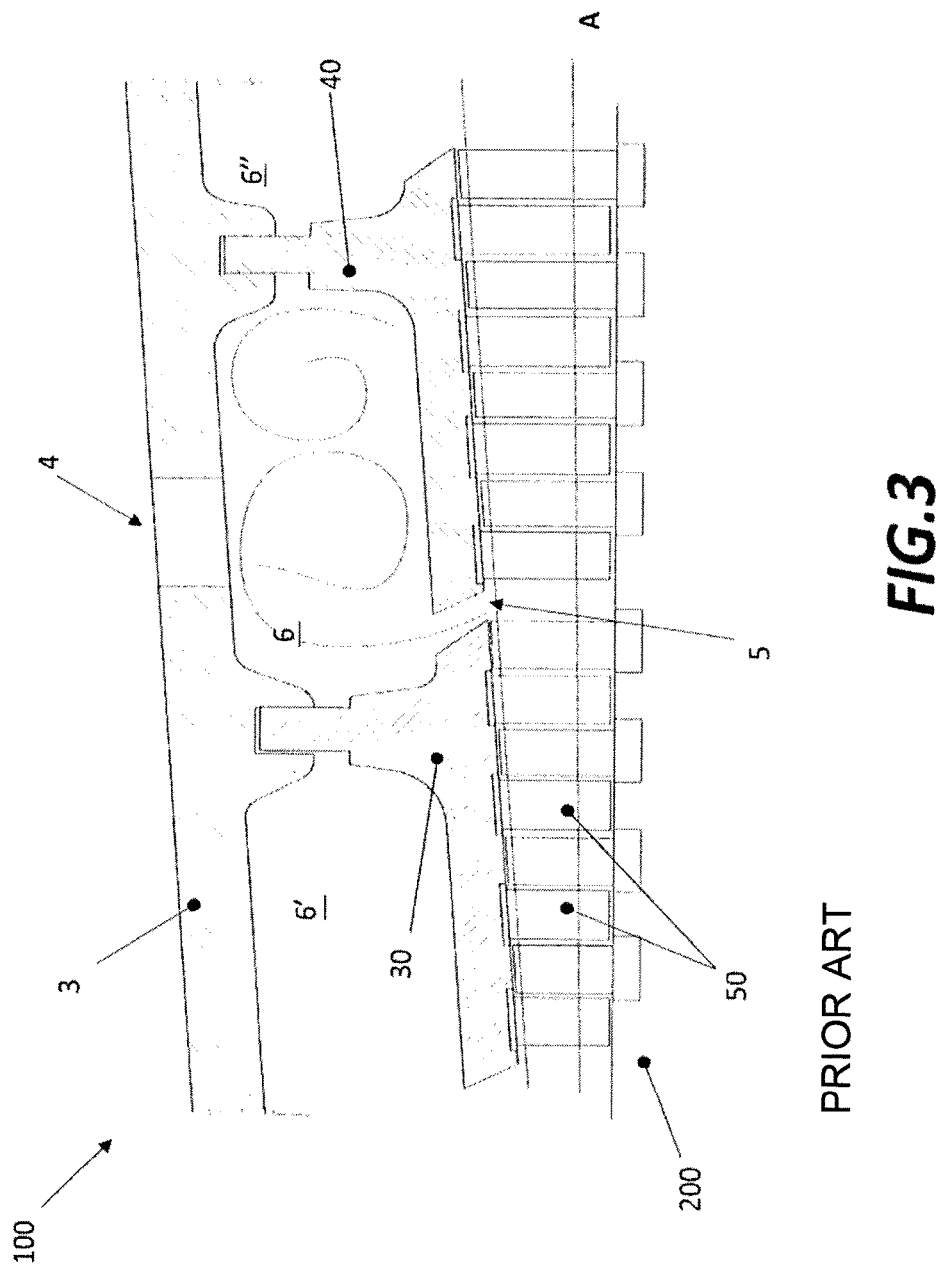
Figure 4:
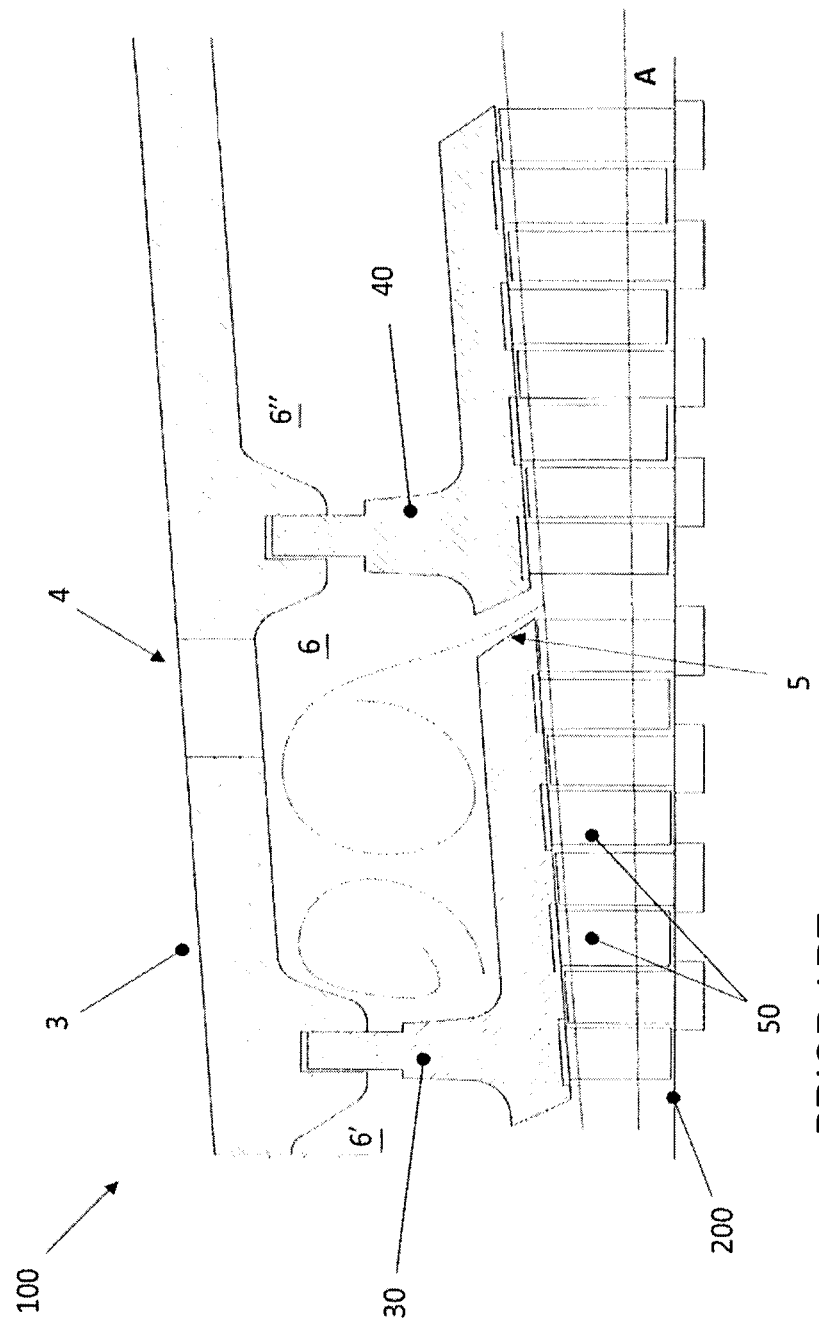

Arrangements shown in following FIGS. 3 and 4 are substantially similar to the one of FIG. 2, with the difference that in FIG. 3 the cavity temperature is on average higher compared to the annulus below, whilst in FIG. 4 the temperature is on average lower. During blow-off of the flow of air through the blow-off opening 4, the temperature of the fluid in the cavity can be significantly different compared to the material temperature of the compressor vane carrier 30, 40 and the rotor 200. For example this may occur at hot restarts where the air is cold but the material is still hot. This can lead to undesired fast shrinkage of the compressor vane carrier and as a consequence of rubbing of the compressor blading.

Figure 5:
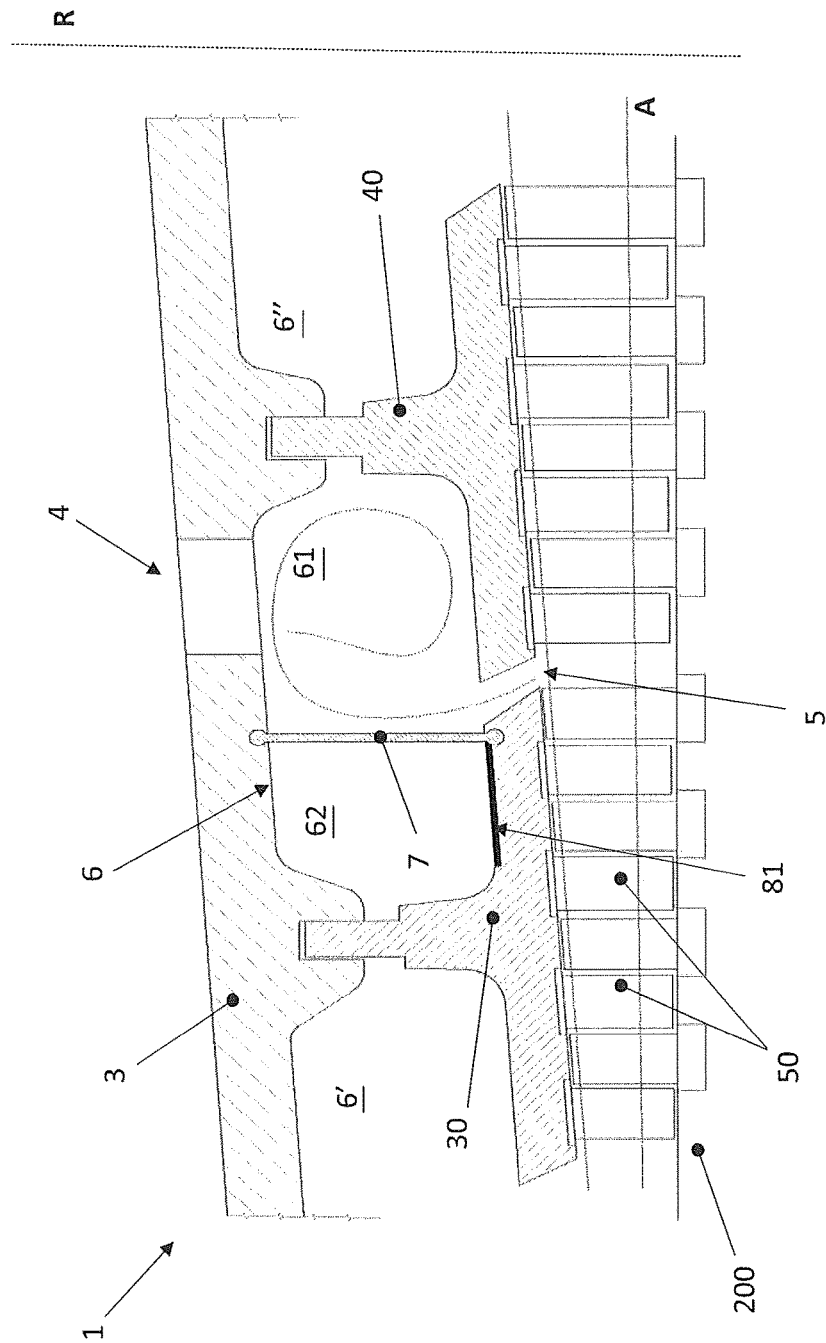
FIGS. 5-8 show a side cross-sectional view of three alternatives of a compressor assembly according to the present invention, where the slot for extracting the flow is located at three different positions along the axial development of the compressor.

With now reference to FIG. 5, it is shown a compressor assembly 1 according to the present invention. With respect to known arrangements shown in preceding FIGS. 2-4, the compressor assembly 1 according to the invention comprises a separator element 7, or a membrane, located in the cavity 6 and arranged therein such to divide cavity 6 into two sub-cavities 61 and 62. The separator element 7 is preferably arranged radially in the compressor assembly 1 along a radial direction R, and between the outer casing 3 and the vane carrier 30. Thanks to the present solution, the separator element divides the cavity in a first sub-cavity 61 where a high heat transfer is accepted and in a second sub-cavity 62 which, on the contrary, is not exposed in the same way to high flow velocities and undesired temperatures. The positioning of the separator element may then be used to guide the flow in an advantageous way and for example to reduce the number of vortices. As a consequence, the flow losses are then reduced.

Preferably, one or more inner walls of the cavity 6 may be covered with a thermally insulating layer 81. Examples of thermally insulating layers generally used in gas turbine structures to insulate cavity's inner walls during transients, thus reducing their deformations, may typically be ceramic-based coatings with very low conductivity. There are many technologies to apply these coatings. For big structural components APS (atmospheric plasma spray) or HVOF (high velocity oxy-fuel) are the more usual.

Alternatively or additionally, it is also possible to provide further insulation to the inner walls of the cavity, and in particular to the walls of the compressor vane carriers, by creating recesses onto their surfaces and shielding those via metal sheets with low thermal conductivity. In that way, advantageously, a layer of thermally-insulated air is interposed between the inner cavity wall and the metal surface.

Preferably, the separator element 7 may also comprise venting holes on a surface thereof (not shown) to vent the sub-cavity 62. This avoids that the sub-cavity sealed by the separator element 7 is flooded by air of the neighbouring cavity 6' due to potential leakages. Venting holes on the element 7 and can eliminate undesired pressure differences.

Figure 6:
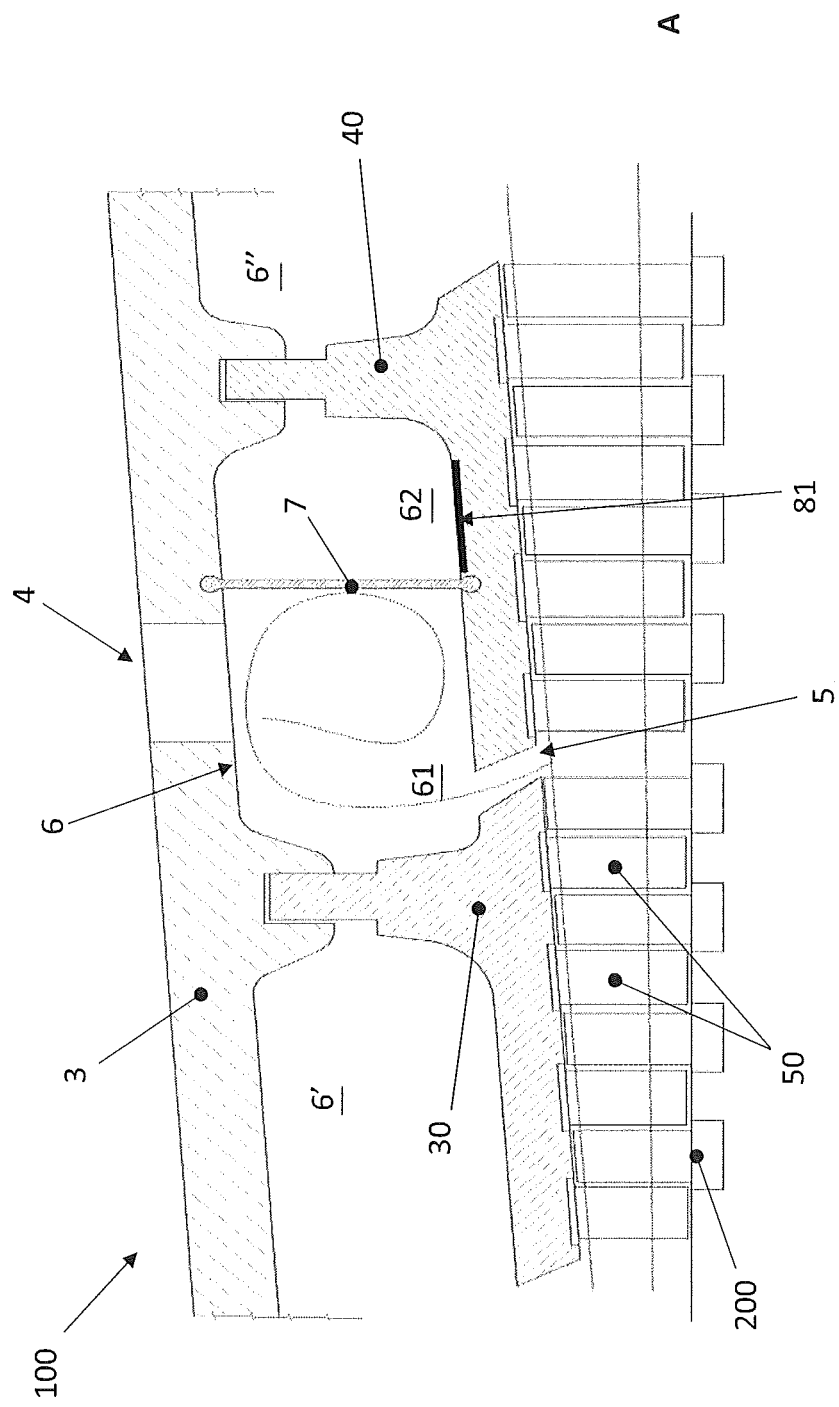
Figure 7:
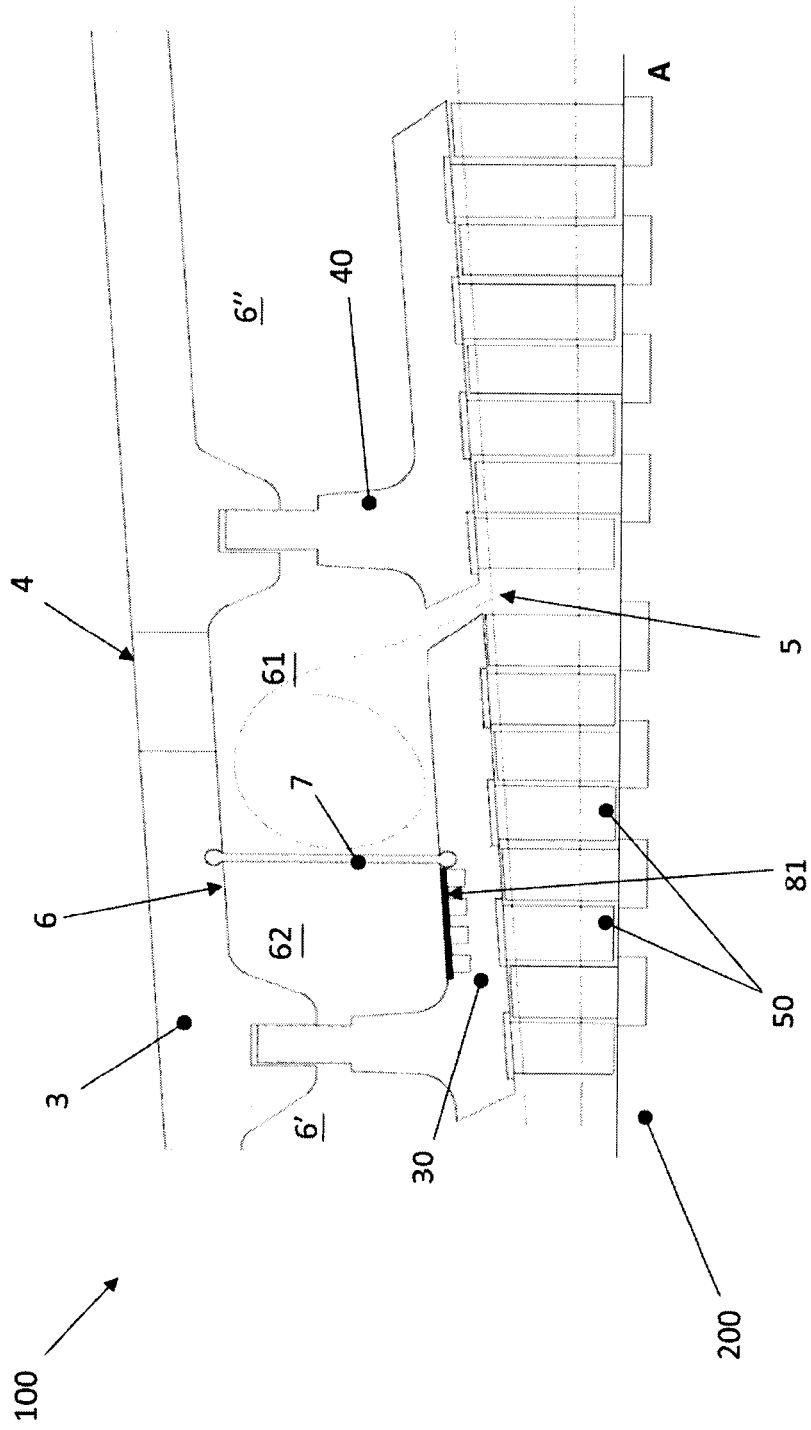

Subsequent FIGS. 6 and 7 show, in a similar way as described for the known art, the compressor assembly 1 according to the invention in two different configurations, and respectively: in FIG. 6 the temperature of the flow in the cavity is on average higher than the temperature of the flow in the corresponding portion of the compressor annulus; in FIG. 7 the temperature of the flow in the cavity is on average lower than the temperature of the flow in the corresponding portion of the compressor annulus.

Figure 8:
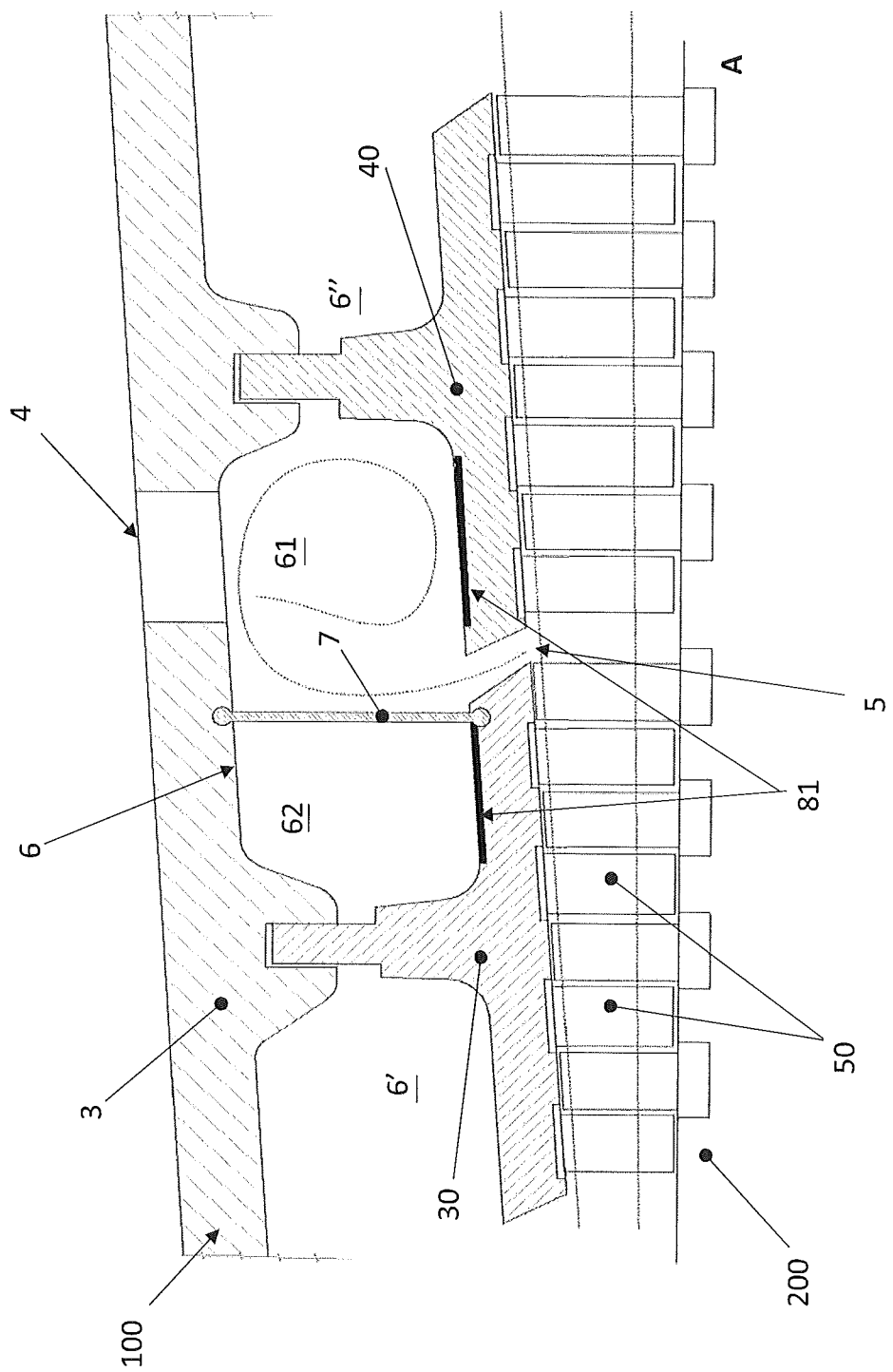

With reference now to following FIG. 8, it is shown an example where a plurality of inner walls of the cavity 6 are covered with a thermally insulating material 81. Moreover, the separator element 7 has upper and lower ends 72 and 73 located within corresponding grooves embedded in respective opposed inner walls of the cavity 6. In the non-limiting example here described, the element 7 is interposed between the compressor outer casing 3 and the compressor vane carrier 4.

Preferably, the separator element 7 may be a sheet-metal plate split in two halves. In some cases it might be a more complex sheet-welded construction comprising reinforcement ribs to have a frequency response which better adapts to vibrations or engine Eigen-frequencies.

Depending on the steady state temperature and the delta pressure expected in the two sub-cavities, a different steel alloy might be selected. For a cold application a steel for pressure applications has proven to be suitable. For hotter applications, a hot resistant steel (chromium based) might be needed. Special attention has to be paid also to the oxidation behaviour, as debris could fly through the piping and occlude the turbine cooling wholes.

As described above, the separator may be inserted in the grooves created into the inner walls of the cavity. Due to a pressure delta between the bleed sub-cavity 61 and the adjacent sub-cavity 62, the separator element 7 is pressed against flow direction. The separator element 7 may also be fixed (by means, for example, of a screw/weld connection) to one of the casings, such as the vane carrier or the outer compressor casing, and then slid into the other component. An intermediate option to ensure a precise positioning of the separator element towards the casings while avoiding any fixed connections is to provide supporting elements (such as weld-ons/screwed supports/positioning pins) which define its radial position (concentricity to one of the casings) but allow radial relative displacements (one component grows faster than the other). In this way the displacements due to thermal stresses are guided but not constrained. This also avoids additional connections and facilitates the manufacturing and maintenance by letting the separator element as an independent part.

Figure 9:
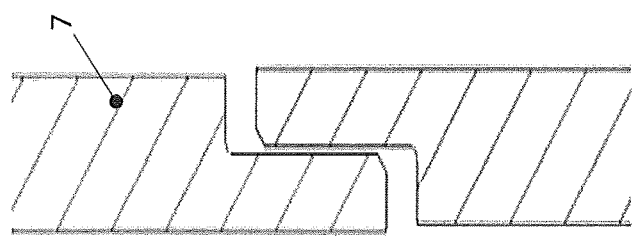
FIG. 9 shows a particular of the separator element depicted in figured 5-8.
Figure 9:
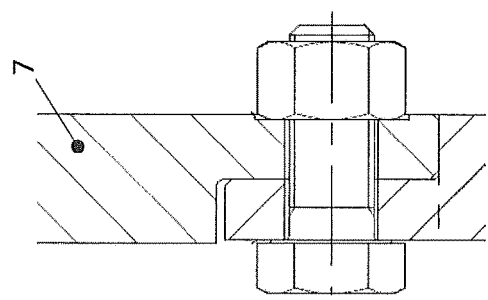

With reference to last FIG. 9, depending whether a sealing between the two sub-cavities of the cavity has to be ensured or not, the two halves of the separator element 7 may have to be bolted to each other (on the left). Another simpler alternative is to have a sealing lip between the two halves (on the right).

Although the present invention has been fully described in connection with preferred embodiments, it is evident that modifications may be introduced within the scope thereof, not considering the application to be limited by these embodiments, but by the content of the following claims.

The invention claimed is:

1. A compressor assembly for a compressor of a gas turbine, the compressor assembly comprising:
    a compressor outer casing including at least one blow-off opening;
    a vane carrier defining a bleed duct;
    wherein the compressor assembly is arranged such that the outer casing and the vane carrier define a cavity for gathering a flow of fluid, said cavity being adapted to receive the fluid through said bleed duct and to feed the fluid externally through said at least one blow-off opening; and
    wherein the compressor assembly includes a separator element having a first end fixed to the outer casing and a second end fixed to the vane carrier, the separator element located in said cavity for dividing said cavity into first and second sub-cavities, wherein the first sub-cavity is in fluid communication with the at least one blow-off opening and wherein the second sub-cavity and the separator element are unperforated and an extension of the separator element along its entire length in a radial direction R of the compressor is greater than an extension of the separator element in an axial direction.

2. The compressor assembly according to claim 1, wherein said separator element is arranged between said outer casing and said vane carrier.

3. The compressor assembly according to claim 1, wherein at least an inner wall of the cavity is covered with a thermally insulating layer.

4. The compressor assembly according to claim 1, wherein said thermally insulating layer comprises a coating material.

5. The compressor assembly according to claim 1, wherein said coating material is a ceramic-based coating.

6. The compressor assembly according to claim 3, wherein said thermally insulating layer comprises a metal sheet positioned on said inner wall of the cavity, said inner wall having a plurality of recesses such to establish a layer of thermally-insulating air between said inner wall and said metal sheet.

7. The compressor assembly according to claim 1, wherein the separator element has upper and lower ends located within corresponding grooves embedded in respective opposed inner walls of said cavity.

8. The compressor assembly according to claim 1, wherein said separator element comprises two halves connected to each other.

9. The compressor assembly according to claim 8, wherein said two halves are connected by bolted elements.

10. The compressor assembly according to claim 8, wherein said two halves are connected by a sealing lip.

11. A compressor for a gas turbine comprising a compressor assembly according to claim 1.

* * * * *